Patented Jan. 19, 1954

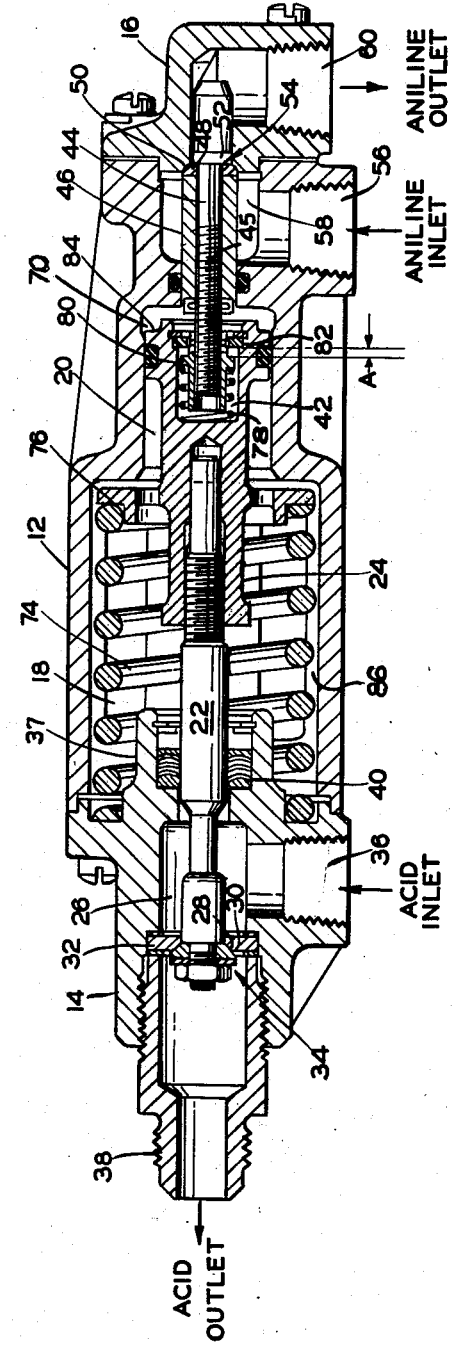

2,666,449

UNITED STATES PATENT OFFICE 2,666,449

VALVE MEANS FOR CONTROLLING TWO INDEPENDENT SOURCES OF PRESSURIZED FLUID

Walter D. Teague, Jr., Alpine, N. J., assignor to Bendix Aviation Corporation, Teterboro, N. J., a corporation of Delaware Application March 28, 1949, Serial No. 83,857

4 Claims. (Cl. 137—630.22)

1

The present invention relates to valves and more particularly to the type adapted to govern the flow of separate fluids simultaneously.

The device is particularly utile in a rocket engine fuel system or the like where it is desired to control the flow of the fuel and of the propellant, and to control the sequence in which the fluids are admitted to the combustion chamber.

Similar devices of the prior art have been employed to control the flow of propellants such as acid and aniline for example, to a rocket engine, but these have been generally of the type wherein a piston and yoke controls the two valve seats. Such valves have been subject to malfunctioning due to misalignment of parts, and because of their relatively more complicated construction, which resulted in leakage and uneven operation. In addition, these valves have generally been operated by an additional fluid other than that which they controlled, such as hydraulic oil. This required the use of an accumulator or other equivalent means in the oil line so that the oil pressure could be raised, thus actuating the valve.

It is therefore one of the objects of the present invention to provide a valve of the above indicated nature wherein the foregoing disadvantages are eliminated, and to do so by novel and effective means.

Another object of the invention is to provide a valve of in-line construction, which requires a minimum of accurately aligned parts for satisfactory operation.

Another object of the invention is to provide a bi-propellant valve designed to be operated by the pressure of one of the fluids which the valve controls.

Another object of the invention is to provide a bi-propellant valve adaptable for a rocket engine fuel system wherein a controlled time lag governs the sequence in which the propellants flow.

Still another object of the invention is to provide a novel type of bi-propellant valve wherein leakage is substantially eliminated.

Still a further object of the invention is to provide a valve of the above-indicated nature wherein the valve seats of the respective fluids are mechanically independent.

Still another object of the invention is to provide a valve of the above indicated nature containing balanced seats to insure more positive operation of the valve.

Another object of the invention is to provide a valve of the above indicated nature of simplified construction, smoother operation, and relatively low pressure loss, and still be easy to adjust, simple to manufacture, and positive and effective in operation.

The foregoing and other objects and advantages will appear more fully hereinafter from a consideration of the detailed description which follows taken together with the accompanying drawing, wherein one embodiment of the invention is illustrated by way of example.

It is to be expressly understood, however, that the drawing is for the purpose of illustration only and is not to be construed as defining the limits of the invention, reference being had for this purpose to the appended claims.

Referring to the drawing wherein like reference characters designate like parts throughout the several views:

Figure 1 is an elevation in section taken along the line 1—1 of Figure 2.

Figure 2 is a plan view partly in section of Figure 1.

Referring now to Figure 1, a casing 12 contains ends 14 and 16 separated by spring chamber 18 and piston chamber 20. A valve stem 22 is disposed lengthwise in the chamber 18 and screw threadedly engages a piston 24 on the right end as shown in Figure 1. The opposite end of the valve stem 22 extends into chamber 26 and culminates in cone 28 which seats against surface 30 of seat 32 to comprise therewith valve 34 which governs the fluid flow from inlet 36 in the end 14, through the chamber 26 and the outlet nipple 38 which is threaded into the end 14.

An annular boss 37, integral with the end 14 extends into the spring chamber 18 and is concentrically disposed about the stem 22 to accommodate therebetween sealing chevron assembly 40 thus preventing leakage from the chamber 26 along the valve stem 22 into the spring chamber 18.

The piston 24 is bored on the right end to form a chamber 42. A second, and relatively smaller valve stem 44 colinear with valve stem 22 and having external threads 45 formed thereon, extends from within the chamber 42, through a sleeve 46 that culminates in a cone 48 which seats against surface 50 of the passage 52 to form a second valve 54 which governs the flow from inlet 56 into the chamber 58, through the passage 52 to the fluid outlet 60. Sleeve 46 is internally threaded to receive external threads 45 of stem 44.

Referring now to Figure 2, the inlet 56 also communicates with passageway 62 which is connected to passageway 64 by means of constriction 66 in a removable plug 68 and hence with chamber 70 to normally closed outlet 72. Outlet 72 is normally closed by a suitable means such as a conventional valve 73. The main spring 74 bears at one end, the left, against the end 14 and on the opposite end bears against shoulder 76 of the piston 24 thereby maintaining cone 28 firmly against its seat 30 in the nul-operating position of the valve. A smaller spring 78 about the stem 44 is anchored at one end against the bottom of the bore chamber 42 and at the opposite end against a shoulder 80 that is internally threaded to receive threads 45 of stem 44 whereby shoulder 80 is adjustably fastened to the stem 44, thereby maintaining the cone 48 firmly against the seat 50. A member 82 secured to the piston 24, and situated at a distance "A" (Figure 1) from the shoulder 80 extends toward the stem 44 so as to engage the shoulder 80 during operation of the valve.

Having thus described the device, in operation, it will now be apparent that when two fluids, as for example, an acid and aniline are admitted under pressure into the valve through the inlets 36 and 56 respectively, both valves 34 and 54 being closed, the aniline will pass through chamber 58 into passageway 62, through the constriction 66, into passage 64 of Figure 2 and hence into chamber 70. Because of the balanced design of the unit, valves 34 and 54 will remain closed as long as the outlet 72 is open. When the outlet 72 is closed by any suitable means such as valve 73, fluid pressure will build up against the face 84 of the piston 24, thereby forcing the piston 24 to the left against the force of the main spring 74, and actuating valve stem 22 to unseat the cone 28 and begin opening the valve 34, thus permitting the acid to flow from the inlet 36 to the outlet 38.

The valve 54 remains closed due to the force of the spring 78 acting on shoulder 80 fastened to the stem 44, until the piston 24 has moved a distance equivalent to the distance "A" (Figure 1). As pressure continues to build up against the face 84, the member 82 will engage the shoulder 80 and pull the stem 44 leftward thereby unseating the cone 48 and now begin opening valve 54 thus permitting the aniline to flow from the inlet 56 through the valve 54 to outlet 60. As pressure rises still more against face 84, valves 34 and 54 continue to move until the full open position is reached.

To close off flow through the unit, the outlet 72 is opened by opening valve 73, thereby relieving the pressure against the face 84 of the piston 24, and the main spring 74 will immediately push the piston back to its original position thereby closing valves 34 and allowing spring 78 to close valve 54. This closing action takes place very rapidly since the constriction 66 affects opening time only.

In application to the fuel system of a rocket, for example, there is thus provided a positive and effective means for admitting one of the propellants first to the combustion chamber, and of adequately regulating the time lag until the admission of the second propellant, since it is apparent that by selecting the setting of the distance "A," varied by adjusting position of shoulder 80 on stem 44, the time lapse between the unseating of cones 28 and 48 may be controlled.

The operating speed of the valve is governed by the diameter of the constriction 66. The valve may be made to operate with any desired speed throughout a relatively wide range of operating speeds by removing the plug 68 and substituting therefor an identical plug, but with a constriction passage therethrough of different diameter.

To insure safe operation of the valve the casing 12 is furnished with relatively large cut-out 86 connecting the chamber 18 with the atmosphere, thereby negating the possibility that fluids from either end may leak past their respective seals into the chamber and come into contact with each other within the valve assembly and thereby create a dangerous condition. In this respect, the general in-line assembly of the valve minimizes the possibility of leakage, as well as of malfunctioning, due to misalignment of parts.

There is thus provided a valve adapted to control the flow of two fluids simultaneously and actuated by one of the two fluids adapted to permit one fluid to begin flowing a desired time increment after the other, which is relatively easy to assemble, economical to manufacture, with a minimum of leakage and yet reliable and effective in operation.

Although only one embodiment of the invention has been illustrated and described, other changes and modifications in the form and relative arrangements of parts which will be apparent to those skilled in the art may be made without departing from the spirit and scope of the invention.

What is claimed is:

1. In a valve, the combination of a casing, a fluid inlet and outlet in one end of said casing, a second fluid inlet and outlet in the opposite end of said casing, a spring chamber between said inlets and outlets, a first spring within said chamber, cut outs in said casing connecting said spring chamber to atmosphere, a valve stem having a valve member at one end controlling flow from said first inlet to said first outlet, said first valve stem extending into said spring chamber and biased by said spring, a piston in said casing screw threadedly engaging the opposite end of said first valve stem, a spring chamber in the opposite end of said piston, a second valve stem colinear with said first valve stem and having a valve member adapted to control fluid flow from said second inlet to said second outlet, an adjustable shoulder on said second valve stem adapted to be engaged by said piston, a second spring in said piston spring chamber biasing said second valve stem to maintain said second valve member in closed position, fluid pressure communicating means from said second fluid inlet to said piston to actuate said piston against said first spring to unseat said first valve member and to engage said shoulder to unseat said second valve member, a constriction within said means to regulate the fluid flow therethrough, and a normally closed outlet, to relieve the pressure against said piston, whereby said first spring may restore said first and second valve members to closed position upon the opening of said normally closed outlet.

2. In a valve the combination comprising a casing, a fluid inlet and outlet in one end of said casing, a second fluid inlet and outlet in the opposite end of said casing, a spring chamber including a spring separating said first inlet and outlet from said second inlet and outlet, a first valve stem having a valve member at one end thereof, said first valve stem biased by said spring to move said first valve member to close said first fluid inlet from said first fluid outlet, a piston in said casing attached to the opposite end of said first valve stem and urged by said first spring in a valve closing direction, a chamber in the opposite end of said piston, a second spring in said chamber, a second valve stem having a valve member, said second stem valve colinear with said piston and first valve stem and extending into said chamber, said second valve stem having a shoulder thereon engaged with and biased by said second spring to move said second valve member to close said second fluid inlet from said second fluid outlet, means carried by said piston and engageable with the shoulder on said second valve stem upon movement of said piston in a valve opening direction, constriction controlled fluid passage means adapted to admit fluid from said second inlet against said piston, to actuate said piston against said first spring to unseat said first and second valves, and a normally closed outlet to relieve said fluid pressure against said piston upon opening thereof, whereby said first and second springs may reseat said first and second valves and close said fluid inlets from their respective outlets.

3. In a bi-propellant valve, in combination a casing including an inlet and an outlet for the first propellant, a first valve stem having a valve member governing the flow of said first propellant, a piston connected to said first valve stem, said casing having a second fluid inlet and outlet for the second propellant, a second valve stem colinear with said first valve stem and having a valve member governing said second inlet and outlet, a shoulder on said second valve stem adapted to be engaged by said piston after a predetermined travel of said piston, spring means biasing both valve stems to move their respective valve members to closed position, a chamber adjacent said piston and having a passage to receive fluid from said second propellant inlet to actuate said piston thereby moving said first valve stem to unseat its valve member and permit passage of the first propellant, and to thereby engage said shoulder upon said predetermined travel of said piston to unseat said second valve and permit passage of the second propellant, an outlet communicating with said fluid chamber to relieve the propellant pressure against said piston upon the opening thereof whereby said spring means may return said valve members to a closed position.

4. In a bi-propellant valve, in combination a casing including an inlet and an outlet for the first propellant, a first valve stem having a valve member governing the flow of said first propellant, a piston connected to said first valve stem, said casing having a second fluid inlet and outlet for the second propellant, a second valve stem colinear with said first valve stem and having a valve member governing the flow of said second propellant, a shoulder on said second valve stem adapted to be engaged by said piston after a predetermined travel of said piston, spring means biasing both valve stems to move their respective valve members to closed position, a chamber adjacent to said piston and having a passage to receive fluid from said second propellant inlet to actuate said piston thereby moving said first valve stem to unseat its valve member and permit passage of the first propellant, and thereby engaging said shoulder upon said predetermined travel of said piston to move said second valve stem to unseat its valve member and permit passage of the second propellant.

WALTER D. TEAGUE, Jr.

References Cited in the file of this patent

UNITED STATES PATENTS

| Number | Name | Date |
|---|---|---|
| 791,811 | Osborne | June 6, 1905 |
| 984,440 | Parrott | Feb. 14, 1911 |
| 1,122,008 | Kramer | Dec. 22, 1914 |
| 2,119,084 | McQuiston | May 31, 1938 |
| 2,285,686 | Shanley | June 9, 1942 |
| 2,402,363 | Bradbury | June 18, 1946 |
| 2,409,561 | Harris | Oct. 15, 1946 |
| 2,463,888 | Linaker | Mar. 8, 1949 |
| 2,553,401 | Carr | May 15, 1951 |